(No Model.)

A. S. HOBART & A. W. ELDREDGE.
RUBBER ERASER.

No. 501,421. Patented July 11, 1893.

Witnesses.
Robert Pruitt
Geo. W. Rea.

Inventors.
Arthur S. Hobart
Alonzo W. Eldredge.
By
Edward Taggart Atty.

United States Patent Office.

ARTHUR S. HOBART AND ALONZO W. ELDREDGE, OF BIG RAPIDS, MICHIGAN.

RUBBER ERASER.

SPECIFICATION forming part of Letters Patent No. 501,421, dated July 11, 1893.

Application filed November 14, 1892. Serial No. 451,961. (No model.)

*To all whom it may concern:*

Be it known that we, ARTHUR S. HOBART and ALONZO W. ELDREDGE, citizens of the United States, residing at the city of Big Rapids, in the county of Mecosta and State of Michigan, have jointly invented certain new and useful Improvements in Rubber Erasers, of which the following is a specification.

This invention relates to certain new and useful improvements in rubber erasers, and it has for its object to provide a new and improved holder whereby the rubber eraser can be wholly inclosed and covered when not in use.

To accomplish this object our invention involves the features of construction and the combination or arrangement of parts hereinafter described and claimed, reference being made to the accompanying drawings, in which—

Figure 1:
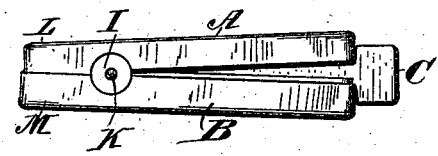
Figure 2:
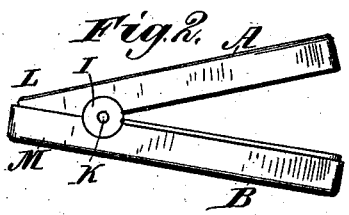
Figure 5:
Figure 3:
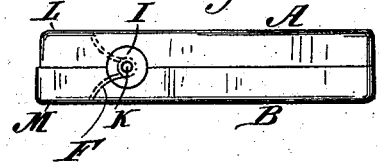
Figure 6:
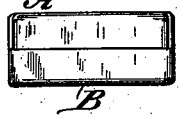
Figure 4:
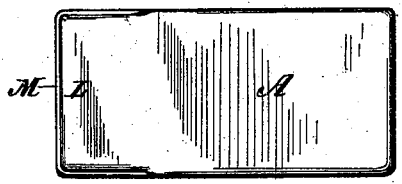
Figure 7:
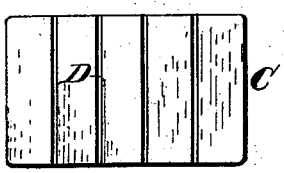
Figures 8, 9:
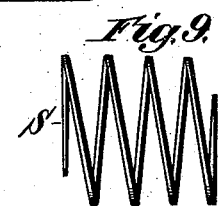

Figure 1 shows a side elevation of our invention with the eraser extended to one groove. Fig. 2 shows also a side elevation with the eraser holder opened and the eraser proper withdrawn. Fig. 3 shows a side elevation with the eraser entirely inclosed within the case, and the case closed. Fig. 4 shows a plan view of the case. Fig. 5 shows a side view of the eraser with grooves for engagement with the eraser holder. Fig. 6 shows a front view of the eraser holder closed. Fig. 7 shows a plan view of the rubber eraser. Fig. 8 shows a detached view of the spring which is used to close and retain closed the holder. Fig. 9 shows a detached view of the spring used in advancing or pushing out the eraser.

Similar letters refer to similar parts throughout the several views.

A and B represent the two parts of the holder which are hinged or pivoted together at I.

C represents the rubber eraser which is provided with grooves, as shown by D. D. The ends of the holders A—B which are preferably made of sheet metal engage with the grooves D—D, thereby securing and holding the rubber C in position for use.

F shows the spring used for closing the holder upon the rubber, and also for entirely inclosing the rubber within the holder. One or more of these springs may be used in connection with the holder A—B.

S represents the spring placed within the holder and bearing against the end of the eraser. The spring S may be attached or secured within the holder, or may be, if desired, attached to the rubber eraser C; its action would be the same in either case. When the eraser C is used as far as it can conveniently be used, on account of the wear, it can readily be removed and a new eraser be inserted in its place.

In using our invention, the shorter ends of the holders can be pressed together with the thumb and finger, thereby opening the longer end, allowing the eraser to be extended to the first groove D; the holder A—B then forms suitable handle for using the eraser proper, the eraser proper which is actually used protruding from the front end of the holder, as shown in Fig. (1). When the eraser is not in use, the rubber C is pressed back in the case, and the case is closed as shown in Fig. (3). By this construction and arrangement of the eraser and eraser-holder, the rubber is always kept clean and in readiness for use, and the user is not compelled to grasp the rubber, but merely the handle or holder. The form of the spring designed to close the holder upon the rubber is immaterial, so long as it is properly placed to subserve the purpose. The shorter end of the holder A, which we have shown by L, fits into the part M of the holder B, and the longer end of A may fit over projections on the inside of B, as shown in Fig. (1). The pivoted construction is preferably a hinge, the upper part integral with A, and the larger part integral with B, and a pivot or rivet K uniting and securing the whole together. It will be understood that the hinge at one side is the same as the hinge at the other, although but one side is shown in the drawings.

Having thus described our invention, what we claim to have invented, and desire to secure by Letters Patent, is—

1. An eraser holder composed of the parts A—B, suitably pivoted together in combination with the rubber C, and a spring adapted to close the two parts A and B upon the rubber, substantially as described.

2. An eraser holder, consisting of a case for wholly inclosing and covering the eraser and composed of two sections A and B pivoted together intermediate their ends so that by pressing on one end the opposite end is opened, in combination with the eraser C, and a spring F acting to close the sections together, substantially as described.

3. The combination of the sections A and B adapted to wholly inclose and cover a rubber eraser and pivoted together intermediate their ends so that by pressing on one end the opposite end is opened, the rubber eraser C provided with grooves D with which the edges of the sections engage for holding the eraser in a fixed position, and a spring F acting to close the sections together, substantially as described.

4. The combination of the sections A and B adapted to inclose and cover a rubber eraser and composed of two sections A and B pivoted together, the rubber eraser C provided with grooves D, with which the edges of the sections engage to hold the eraser in a fixed position relatively to the said sections, and a spring F acting to close the sections together, substantially as described.

In witness whereof we have hereunto set our hands and seals in the presence of two witnesses.

ARTHUR S. HOBART. [L. S.]
ALONZO W. ELDREDGE. [L. S.]

Witnesses:
EDWARD TAGGART,
M. E. HEANEY.